United States Patent [19]

San Juan

[11] Patent Number: 4,717,055
[45] Date of Patent: Jan. 5, 1988

[54] BRACKET FOR TRUCK MOUNTING SKI OR SURFBOARD RACK

[76] Inventor: Alex San Juan, 2414 W. Avenue 32, Los Angeles, Calif. 90065

[21] Appl. No.: 866,236

[22] Filed: May 21, 1986

[51] Int. Cl.⁴ .................................................. B60R 7/00
[52] U.S. Cl. ................................. 224/42.45 R; 224/331
[58] Field of Search ............... 224/331, 370, 42.45 R, 224/42.42, 42.43, 42.44, 273, 321, 319, 309; 296/37.6; 248/121, 146, 200, 220.2, 223.4, 225.31, 235, 499, 352

[56] References Cited

U.S. PATENT DOCUMENTS

| | | | |
|---|---|---|---|
| 3,765,713 | 10/1973 | Suitt | 224/309 X |
| 4,449,656 | 5/1984 | Wonden | 224/331 X |
| 4,461,414 | 7/1984 | Gieber | 224/331 X |
| 4,487,348 | 12/1984 | Mareydt | 224/321 |
| 4,507,033 | 3/1985 | Boyd | 296/37.6 X |

Primary Examiner—Henry J. Recla
Assistant Examiner—Robert M. Petrik
Attorney, Agent, or Firm—Louis J. Bachand

[57] ABSTRACT

A bracket is provided enabling the use of conventional ski, surfboard and like racks over truck beds by positioning appropriately a trough-like gutter shaped section and supporting the same by a base fastened to the truck bed walls.

9 Claims, 4 Drawing Figures

BRACKET FOR TRUCK MOUNTING SKI OR SURFBOARD RACK

TECHNICAL FIELD

This invention has to do with methods and means of mounting conventional racks for skis, surfboards and like roof carried items onto a truck by securing to the opposed side walls of a truck bed. More particularly, the invention is concerned with the provision of a bracket and bracket fastening means for attachment to a pickup truck at the bed sidewalls and subsequent mounting of ski or like racks using the standard roof gutter clamps conventionally furnished with such racks.

BACKGROUND OF THE INVENTION

The proliferation of large size personal recreation equipment, predominantly skis and surfboards, and the increasing popularity of open-bed, pick-up type trucks, especially of the so-called mini-truck size has posed a problem to users. The cabs of such vehicles are not deep enough to permit mounting of the racks in the desired spaced relation, or lack the trough-like gutters needed to mount conventional racks for skis and surfboards. Leaving such equipment loose in the bottom of the truck bed is hazardous from both a safety and a theft point of view.

As is known conventional racks are rigid members the central portion of which bridge the vehicle roof, and whose end portions terminate in clamps having a tougue and keeper structure which engages the vehicle roof gutters on opposite sides and is tightenable by a threaded pin to keep the rack secure to the vehicle. The rack defines equipment support means such as straps for surfboards or pivoted arms for skis which cooperate with the rack central portion to removably hold sporting equipment to the rack.

Truck bed side walls afford no purchase for conventional racks, and thus until the present invention there has been no satisfactory means of attaching such racks to truck beds, making it difficult and inconvenient for truck users to carry their sporting equipment with them safely and securely.

SUMMARY OF THE INVENTION

It is accordingly an object of the invention to provide means of mounting a ski or surfboard rack to a truck using the bed sidewalls as the point of attachment. It is a further object to provide a novel rack bracket which enables the use of the truck bed sidewalls to mount such racks. It is still another object to utilize the conventional clamps of readily available ski, surfboard and like racks in mounting the racks. Yet another object is to convert truck bed side walls to mount conventional racks with minimum protrusion into the cargo space.

The invention realizes the foregoing objects in a bracket for mounting to the side walls of a truck bed a ski, surfboard, or like rack having a rigid central portion and terminal portions defining tongue and keeper anchoring structures by which the rack is normally securable to a vehicle roof gutter, the bracket comprising a base plate fastenable to the side wall, and a gutter-shaped section supported by the base in rack tongue and keeper structure anchoring relation.

In particular embodiments of the invention the gutter-shaped section defines an elongated trough having transverse walls at the ends thereof, the trough being sized to readily accommodate the anchoring structure tongue; the gutter-shaped section is supported by the base in cantilevered relation to freely engage the anchoring structure keeper; and the bracket base plate has a base portion fastened to the truck bed side walls, an offset portion and a flange therebetween, the gutter-shaped section being supported on the offset portion offset by the flange and cantileverd thereover to lie in the plane of the truck bed side wall.

The invention further contemplates the combination of the foregoing bracket and a rack having a rigid central portion and terminal portions defining tongue and keeper anchoring structures by which the rack is normally securable to a vehicle roof gutter.

In particularly preferred embodiments, the invention provides a bracket for mounting to the side walls of a truck bed a ski, surfboard, or like rack having a rigid central portion and terminal portions defining tongue and keeper anchoring structures by which the rack is normally securable to a vehicle roof gutter, the bracket comprising a base plate fastenable to the side wall, and a gutter-shaped section supported by the base in rack tongue and keeper structure anchoring relation, the gutter-shaped section defining an elongated trough having transverse walls at the ends thereof, the trough being sized to readily accommodate the anchoring structure tongue, and wherein the gutter shaped section is supported by the base in cantilevered relation to freely engage the anchoring structure keeper, and the bracket base plate has a base portion fastened to the truck bed side walls, an offset portion and a flange therebetween, the gutter shaped section being supported on the offset portion offset by the flange and cantileverd thereover to lie in the plane of the truck bed side wall, per se and in combination with a rack having a rigid central portion and terminal portions defining tongue and keeper anchoring structures by which the rack is normally securable to a vehicle roof gutter.

THE DRAWINGS

The invention will be further described as to an illustrative embodiment in conjunction with the attached drawings in which.

DETAILED DESCRIPTION

Figure 1:
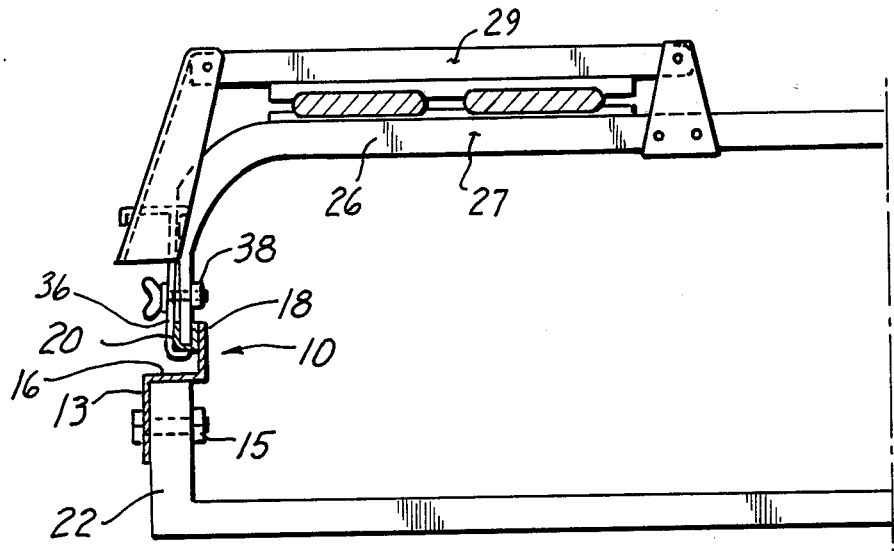
FIG. 1 is a front elevation view of the invention combination of ski adapted rack and mounting bracket in the installed condition.
Figure 3:
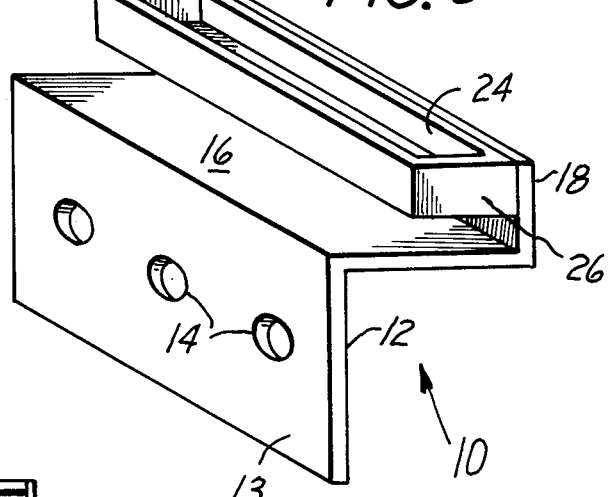
FIG. 3 is a perspective view of the invention bracket.

With reference now to the drawing, in FIG. 3 the bracket 10 is seen to comprise a plate 12, having a base 13 with a series of fastener-receiving holes 14 formed therein, for receiving fasteners such as bolts 15 (FIG. 1). A base plate flange 16 extends normally relative to the base 13, and is itself flanged to form an offset portion 18 parallel to the base 13 and normal to the flange 16. A gutter shaped section 20 is affixed to the plate offset portion 18 by means not shown such as welding, riveting, threaded fasteners etc. to be longitudinally parallel to the base and offset portion, to overlie the flange 16, and as will be seen to be mountable in the vertical plane of the truck bed wall 22. The gutter shaped section defines a trough 24 and has end walls 26 which serve to prevent sliding removal or loss of the rack from the bracket section 20.

As will be evident, the gutter shaped section 20 is simulative of a vehicle roof gutter in having a trough and a wall defining the trough to which a conventional ski rack clamp can be exteriorly affixed, but differs in being movable and more specifically being able to be placed on the side wall of a truck bed, effectively enabling the conventional mounting of a ski or surfboard, or miscellaneous carrier of analogous design in an unconventional place.

Figure 2:
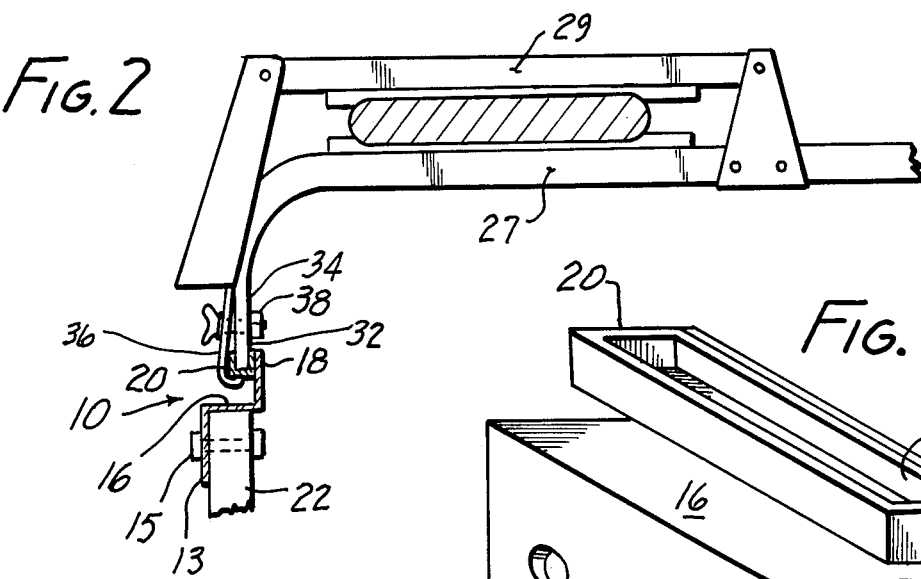
FIG. 2 is a view like FIG. 1 of a surfboard rack adapted bracket.
Figure 4:
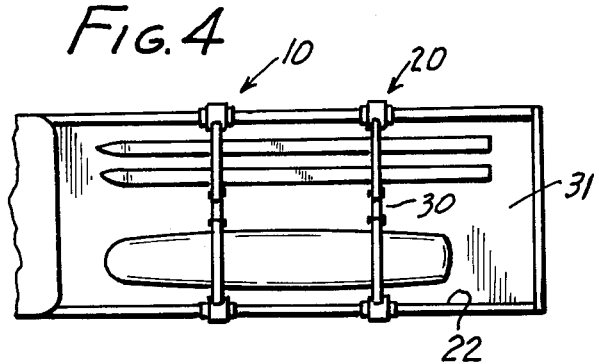
FIG. 4 is a top plan view of a hybrid ski and surfboard rack mounted to a truck above the truck bed and fastened to the bed side walls.

With reference to FIGS. 1, 2 and 4, the bracket 10 is adapted to mount a conventional ski (FIG. 1) or surfboard (FIG. 2) rack, 27, 29 respectively, which are basically similar insofar as the present invention is concerned, and which comprise a rigid, usually tubular metal, central portion 30, and terminal portions 32 which define clamps comprising a rigid tongue 34 and a movable keeper 36 and a locking element 38 to fasten the two in locked relation.

The bracket 10 is shown mounted to a truck bed side wall 22 by bolts 15, and the conventional rack 27, 29 is mounted to the truck so as to surmount the truck bed 30 thereby. The rack 10 is designed such that its gutter shaped section 20 lies in the vertical plane of the truck bed side wall 22 and essentially does not protrude into the cargo space nor provide a snagging danger to persons in the vicinity. The gutter-shaped section 20 rack is adapted to receive endwise typical tongue 34 while the keeper 36 clamps on the outer surface of the gutter shaped section and the whole clamping structure is secured by its fastener 38 as though the rack were an actual vehicle roof gutter segment.

There is thus provided a means of using conventional racks on popular pick-up trucks.

I claim:

1. Bracket for mounting to the side walls of a truck bed, a ski, surfboard, or like rack having a rigid central portion and terminal portions defining tongue and keeper anchoring structures by which the rack is normally securable to a vehicle roof gutter, said bracket comprising a base plate having base portion adapted to be fastened to said truck bed side wall, an offset portion parallel to said base portion, and a flange therebetween at right angles to said base portion and said offset portion, and a gutter-shaped section parallel to said flange and supported on said offset portion offset by said flange and cantilevered over said flange in rack tongue and keeper structure anchoring relation.

2. Bracket according to claim 1, in which said gutter-shaped section defines an elongated trough having transverse walls at the ends thereof, said trough being sized to readily accommodate said anchoring structure tongue.

3. Bracket according to claim 1, in which said gutter shaped section is supported by the base in cantilevered relation to have a free outside surface to freely engage said anchoring structure keeper.

4. In combination the bracket of claim 1, and a rack having a rigid central portion and terminal portions defining tongue and keeper anchoring structures by which the rack is normally securable to a vehicle roof gutter.

5. Bracket for mounting to the side walls of a truck bed, a ski, surfboard, or like rack having a rigid central portion and terminal portions defining tongue and keeper anchoring structures by which the rack is normally securable to a vehicle roof gutter, said bracket comprising a base plate adapted to be fastened to said side wall, an offset portion parallel to said base plate and a flange therebetween normal to said base plate and said offset portion, and a gutter-shaped section supported by the base on said offset portion offset by said flange in rack tongue and keeper structure anchoring relation, said gutter-shaped section being parallel to said base plate and defining an elongated generally rectangular trough having transverse walls at the ends thereof, said trough being sized to readily accommodate said anchoring structure tongue.

6. Bracket according to claim 5, in which said gutter shaped section is supported by the base in cantilevered relation to have a free outside surface to freely engage said anchoring structure keeper.

7. In combination the bracket of claim 5, and a rack having a rigid central portion and terminal portions defining tongue and keeper anchoring structures by which the rack is normally securable to a vehicle roof gutter.

8. Bracket according to claim 5, in which said gutter shaped section lies in the vertical plane of the truck bed sidewall.

9. The bracket according to claim 1, in combination with a truck, said bracket being secured to said truck bed side wall.

* * * * *